(No Model.) 7 Sheets—Sheet 1.
W. SHEDLOCK.
WASHING MACHINE.
No. 421,198. Patented Feb. 11, 1890.
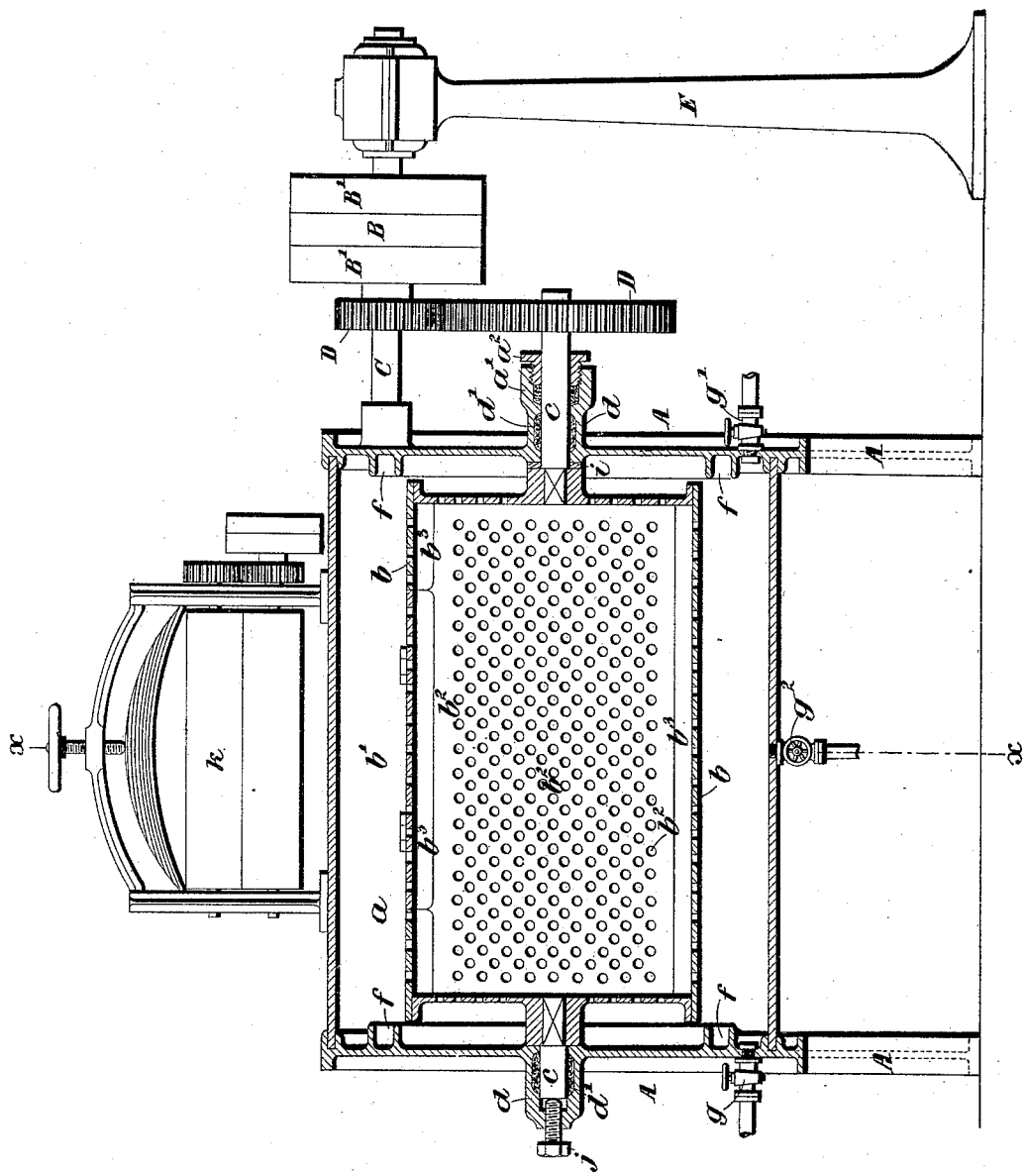
Witnesses.
Geo. W. Rea
Robert Everett
Inventor:
William Shedlock
By
James L. Norris
Atty.

(No Model.) 7 Sheets—Sheet 2.
W. SHEDLOCK.
WASHING MACHINE.
No. 421,198. Patented Feb. 11, 1890.
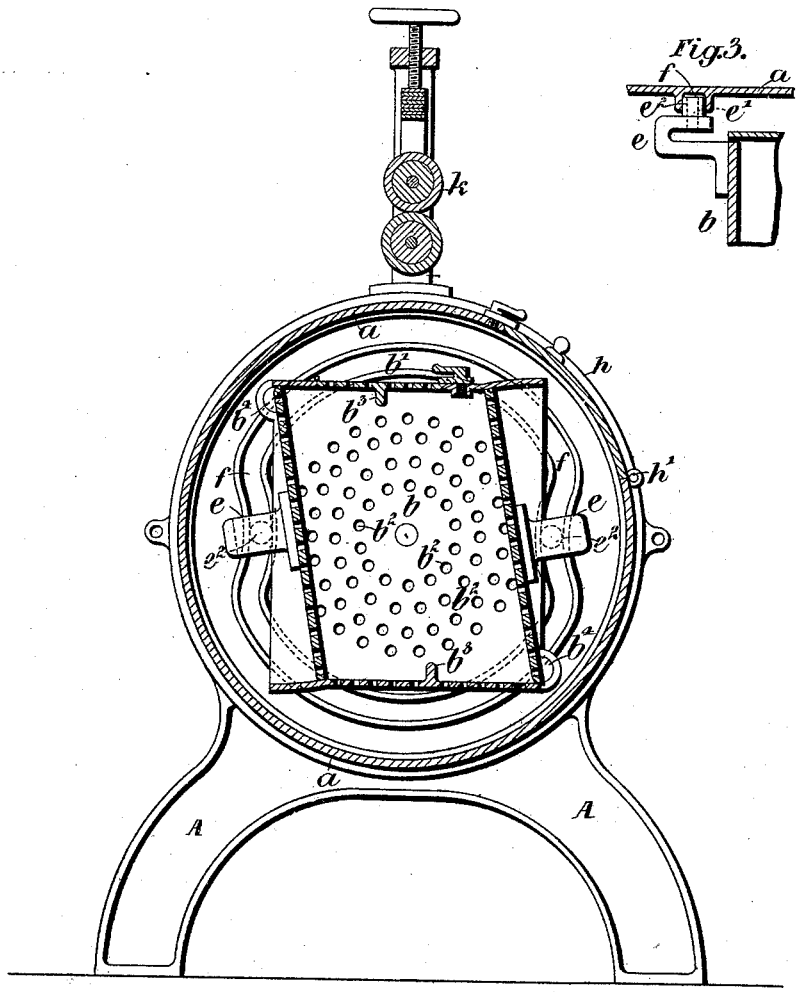
Witnesses.
Geo. W. Rea.
Robert Everett,
Inventor.
William Shedlock
By James L. Norris,
Atty.

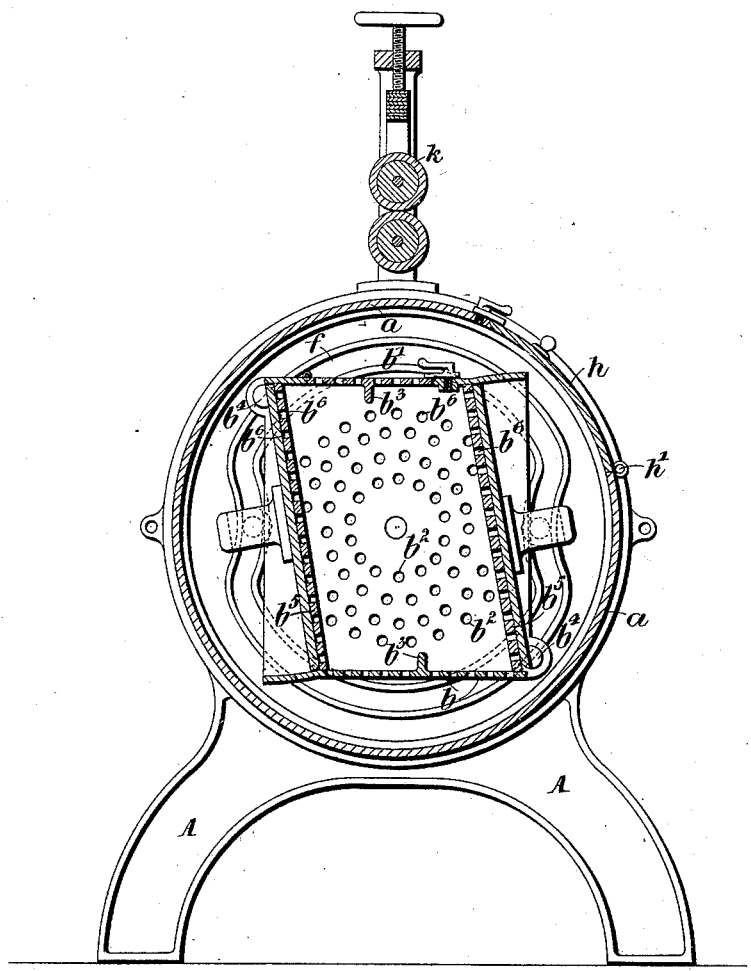

(No Model.)  7 Sheets—Sheet 4.

W. SHEDLOCK.
WASHING MACHINE.

No. 421,198. Patented Feb. 11, 1890.

Witnesses
Geo. W. Rea
Robert Garrett

Inventor
William Shedlock
By James L. Norris
Atty.

(No Model.) 7 Sheets—Sheet 7.

W. SHEDLOCK.
WASHING MACHINE.

No. 421,198. Patented Feb. 11, 1890.

Witnesses,
Geo. W. Rea.
Robt Garrett

Inventor,
William Shedlock,
By James L. Norris
Atty.

UNITED STATES PATENT OFFICE.

WILLIAM SHEDLOCK, OF LONDON, ENGLAND.

WASHING-MACHINE.

SPECIFICATION forming part of Letters Patent No. 421,198, dated February 11, 1890.

Application filed May 27, 1889. Serial No. 312,287. (No model.) Patented in England September 18, 1888, No. 13,490, and March 30, 1889, No. 5,506.

*To all whom it may concern:*

Be it known that I, WILLIAM SHEDLOCK, mechanical engineer, a citizen of the United States of America, and a resident of London, England, have invented new and useful Improvements in Washing-Machines, (for which I have obtained patents in Great Britain, No. 13,490, bearing date September 18, 1888, and No. 5,506, bearing date March 30, 1889,) of which the following is a specification, reference being had to the accompanying drawings.

My invention relates to washing-machines and more especially to machines of the kind or class in which a suitable receptacle for the articles to be washed is so arranged in a box or case that it may be caused to rotate therein, and during such rotation one or more sides of the said receptacle will be moved alternately inward and outward, so as to squeeze or compress the said articles, and thus facilitate the efficient washing or cleansing of the same.

The chief object of my invention is to simplify the construction, reduce the cost of manufacture, and render easy the repair of this class of machines.

My said invention comprises, moreover, various other improvements, hereinafter set forth.

In the accompanying drawings I have shown how my said invention may be conveniently and advantageously carried into practice.

Figure 5:
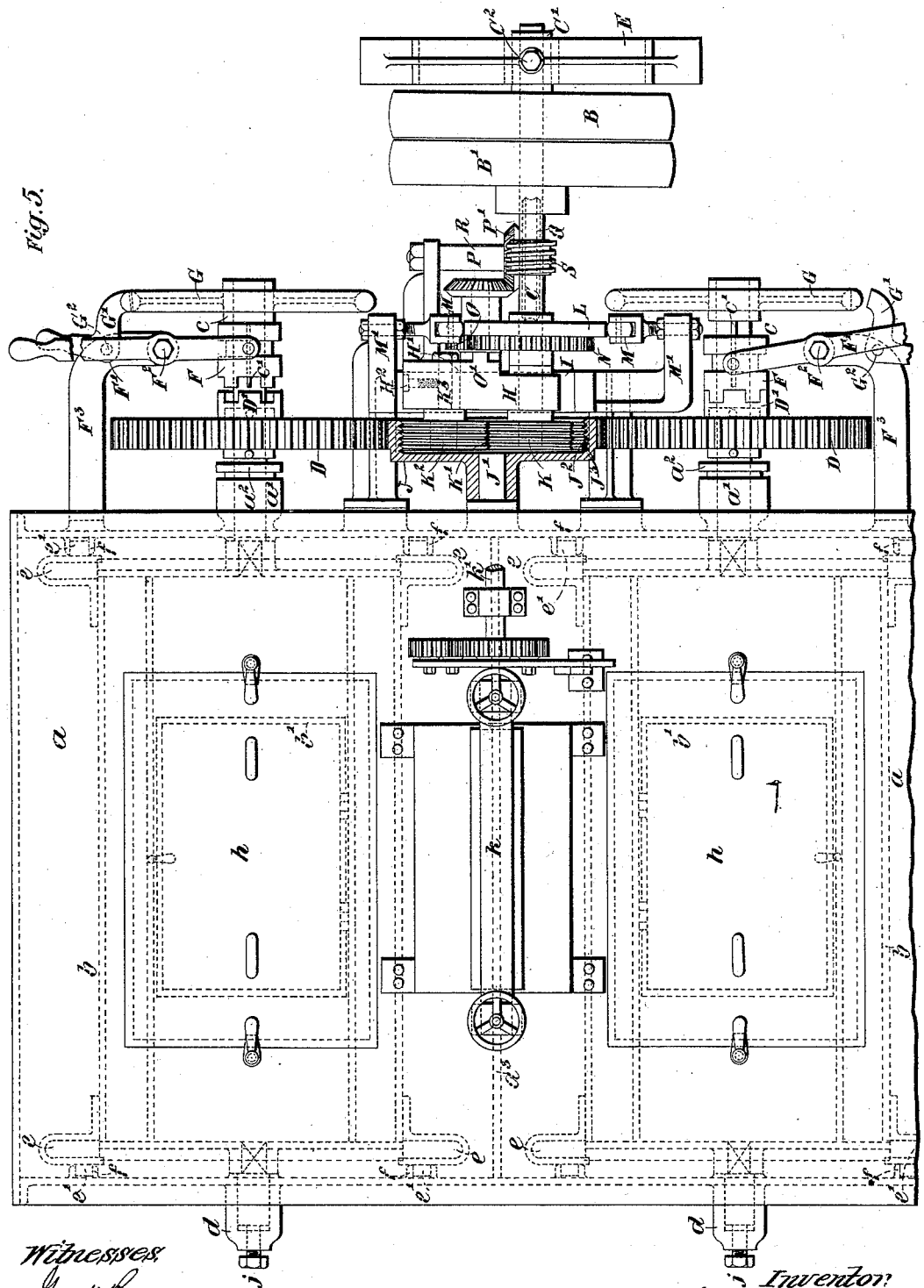
Figure 6:
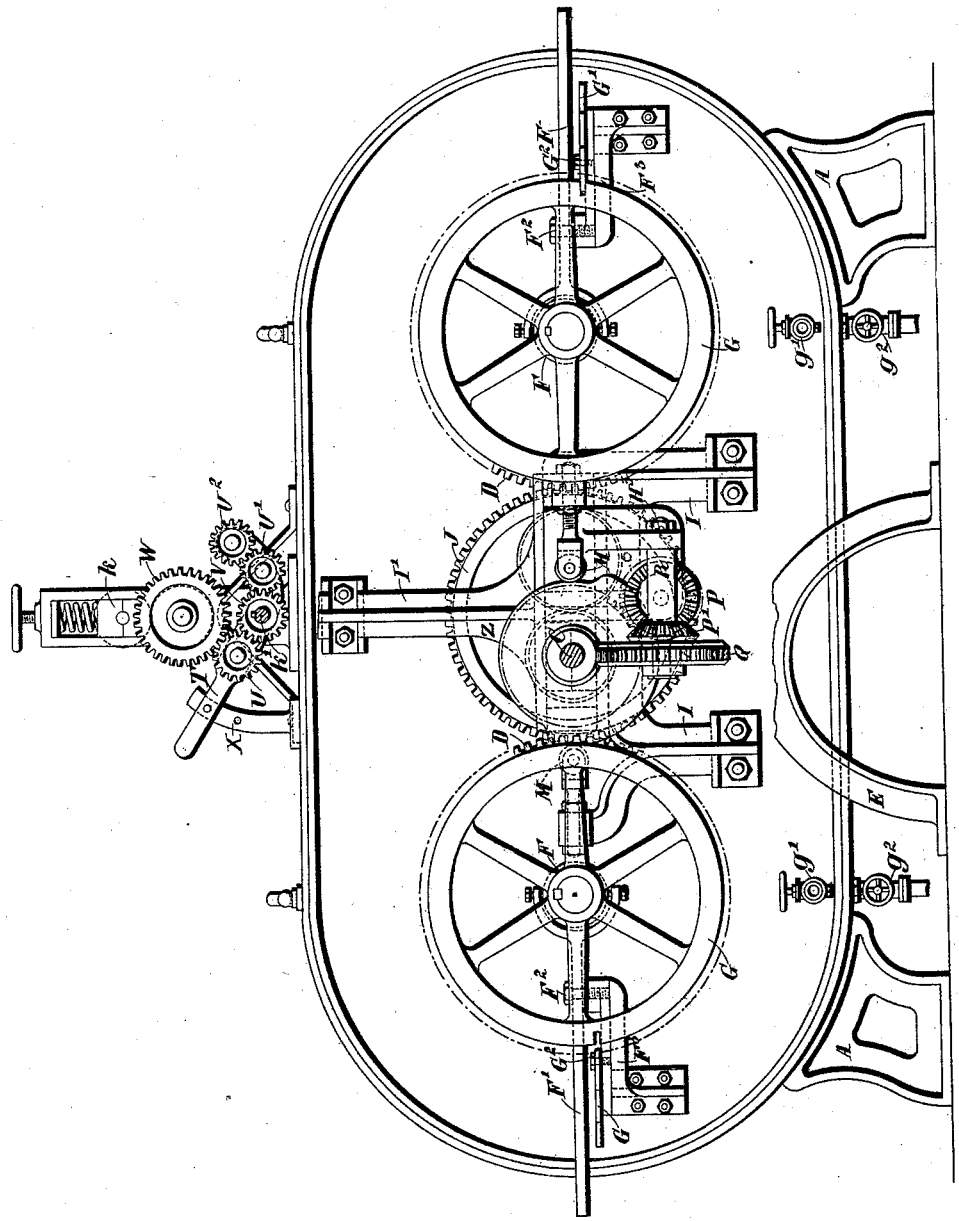
Figure 7:
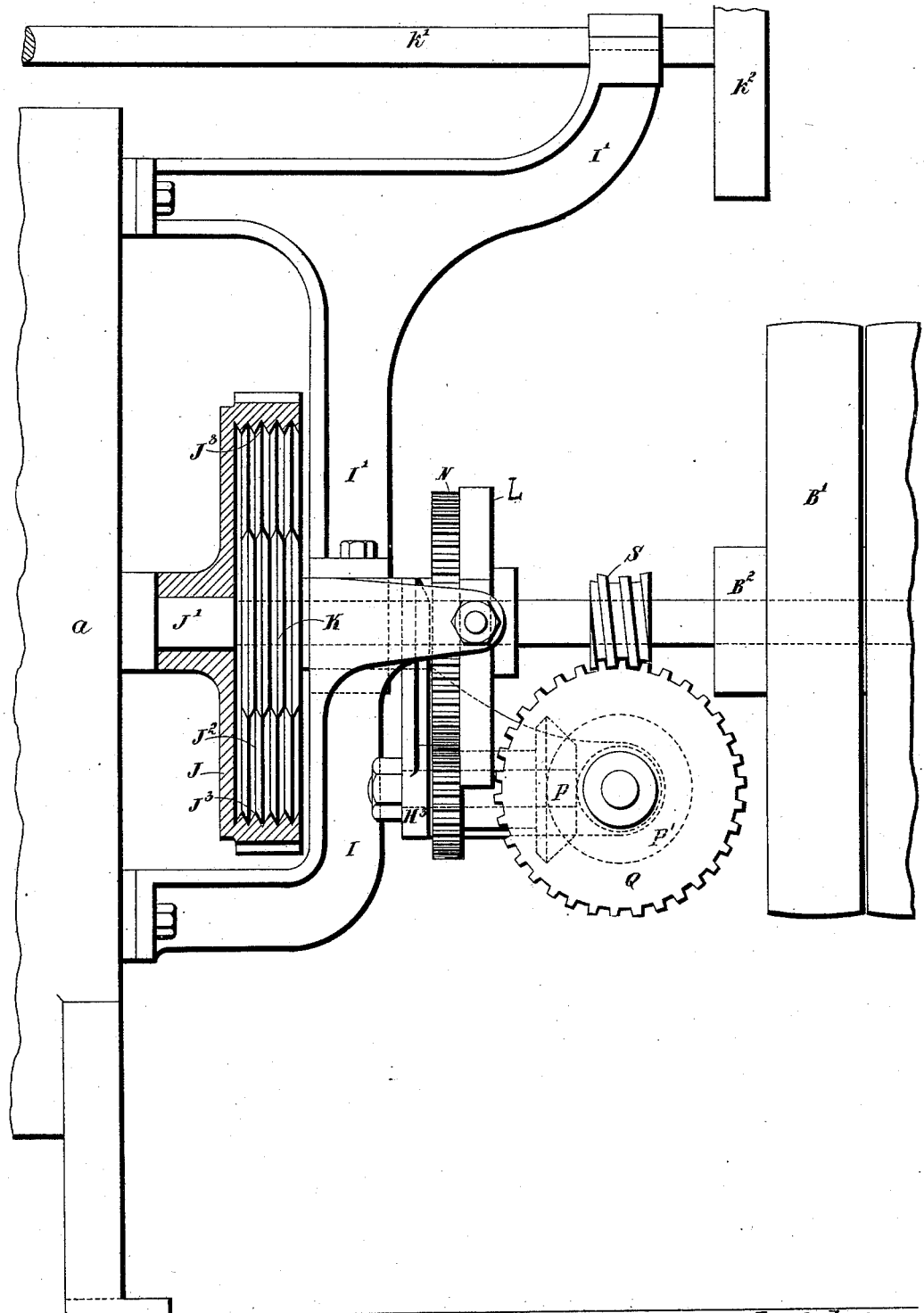
Figure 8:
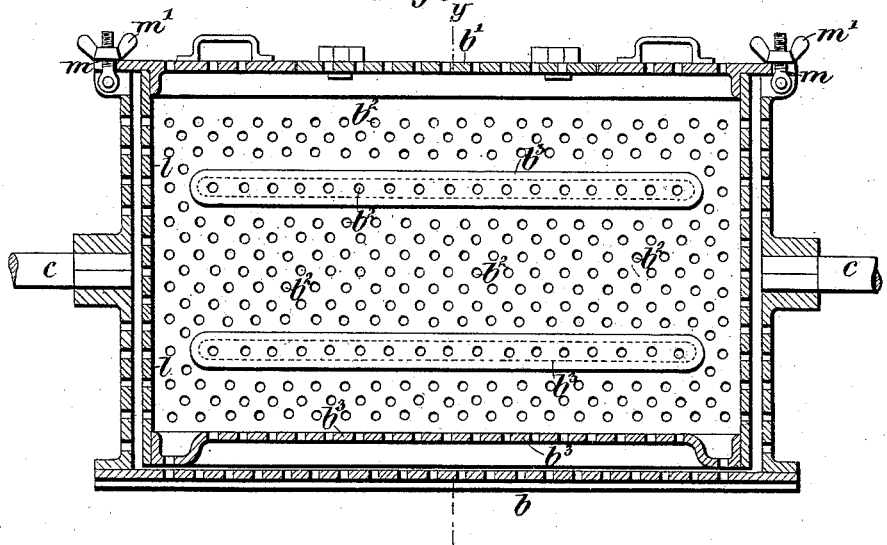
Figure 9:
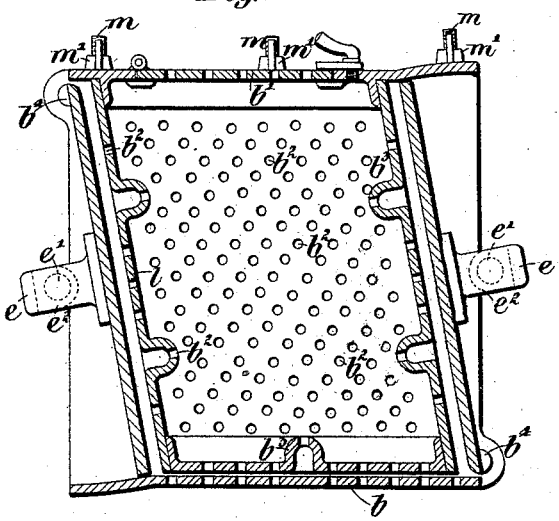

Figure 1 is a vertical longitudinal central section, and Fig. 2 is a transverse section on the line $x\ x$, Fig. 1, showing one form of my improved washing-machine. Fig. 3 is a horizontal section showing a detail of construction, hereinafter described. Fig. 4 is a similar view to Fig. 2, showing a modification of my apparatus. Fig. 5 is a plan. Fig. 6 is a side elevation, and Fig. 7 is a front elevation, a portion of the box or case and other parts being removed, drawn to an enlarged scale, showing a further modification. Fig. 8 is a vertical longitudinal central section; and Fig. 9 is a transverse section on the line $y\ y$, Fig. 8, drawn to a slightly-enlarged scale, showing a still further modification.

Like letters indicate corresponding parts throughout the drawings.

A is the frame of the machine.

B is the driving-pulley, and B' B' are loose pulleys carried upon a shaft C.

D D are toothed wheels for communicating motion to the washing-chamber.

E is an outside bearing or standard for supporting one extremity of the shaft C, the other extremity of which is supported in a suitable bearing in the frame A.

$a$ is a cylindrical box or case, in which is fitted a rectangular or other suitably-shaped washing chamber or receptacle $b$ for the articles intended to be washed or cleansed. The receptacle $b$ is provided with spindles or gudgeons $c$, carried in suitable bearings $d$ (with or without bushings or linings $d'$, of soft metal or other suitable material) in the said cylindrical box or case $a$. One of these gudgeons extends through a stuffing-box $a'$ and gland $a^2$ in the wall of the box or case $a$ and carries one of the toothed wheels D.

Rotary motion may be imparted to the shaft C by means of belt-gearing from an engine or other source of motive power through the pulley B, and will be transmitted to the receptacle $b$ through the toothed wheels D. By providing two loose pulleys B', I am enabled to employ a crossed and a straight driving-belt and to reverse the motion of the receptacle $b$ by shifting the said belts. For shifting the said belts I employ an ordinary striking-gear of any suitable construction, which can be operated by hand; or I may employ any well-known device to shift the said striking-gear automatically at predetermined periods, and thus reverse the motion of the receptacle $b$. I sometimes employ a friction device, hereinafter described, for periodically reversing the motion of said receptacle $b$. The receptacle $b$ is provided, moreover, with a door $b'$, through which the articles intended to be washed can be introduced. $b^2\ b^2$ are perforations to allow free passage for the water or other liquid through the sides and door of the said receptacle $b$. The sides of the said receptacle are provided upon their interior surface with ribs or projections $b^3$, which are preferably arranged on alternate sides in a diagonal and parallel direction, respectively, to the said sides.

Two of the sides of the receptacle $b$ are pivoted at $b^4$ to the ends of the said receptacle in such a manner that the opposite extremities of the said sides can move inward. The said sides are, moreover, provided with arms $e$, (more clearly shown in Fig. 3,) having pins or projections $e'$ and anti-friction rollers $e^2$, adapted to run in suitable cam-grooves $f$, provided in the interior of the cylindrical box or case $a$. The said pivoted sides are so arranged as to be operated simultaneously twice in each revolution of the receptacle, so as to cause the said sides to move inward and squeeze or press the articles contained in the said receptacle $b$ between the said two movable sides, thereby greatly adding to the efficiency of the operation of the apparatus for washing or cleansing clothes or other articles. The movable sides, however, may be arranged so as to be operated any other suitable number of times in each revolution of the receptacle $b$.

$g$ $g'$ $g^2$ are stop-cocks or valves for regulating the supply of water, steam, and running off the water contained in the box or case $a$ when required.

$h$ is a door hinged at $h'$, permitting access to the revolving receptacle $b$.

I sometimes arrange the cam-grooves $f$ so that the hereinbefore-mentioned door $b'$ in the revolving receptacle $b$ will coincide with the door $h$ in the cylindrical box or case $a$ when the movable sides are compressed, and the said receptacle presents, therefore, its smallest dimensions, thus preventing the filling of the said revolving receptacle $b$ too full of clothes or other articles, and thereby obviating the inconvenience frequently resulting therefrom.

To form a perfectly water-tight joint round the gudgeon $c$, that carries the toothed wheel D, I sometimes provide in addition to or in place of the stuffing-box $a'$ and gland $a^2$ a leather, india-rubber, or other suitable washer $i$. $j$ is a setting-up screw, by means of which endwise pressure can be applied to the gudgeon $c$, so as to compress the washer $i$ and form a water-tight joint.

In some instances I provide upon the top of the box or case $a$, or in any other suitable position thereon, a wringer $k$ of any well-known construction.

In the smaller machines, more especially intended for domestic use, I dispense with the pulleys and toothed gearing hereinbefore described, and I provide upon the extension of the gudgeon $c$ a suitable crank-handle, by means of which the receptacle $b$ can be rotated.

In the modification illustrated in Fig. 4 I arrange within the inner revolving receptacle $b$ diaphragms or partitions $b^5$, having perforations $b^6$ to permit the free passage of the water into and from the washing-chamber or space. The diaphragms or partitions $b^5$ are firmly secured in any suitable manner to the fixed sides of the revolving receptacle $b$ in such a position as to be just clear of the movable or collapsing sides when the latter are in their innermost position. The movable or collapsing sides are in this case made solid—that is to say, they are not perforated, as in the machine shown in Figs. 1 to 3. They therefore act as pump plungers or pistons for alternately forcing the water from and sucking it into the revolving receptacle $b$. By this means the articles contained in the said revolving receptacle are washed or cleansed in a very efficient manner.

By the employment of the perforated diaphragms or partitions, as above described, I obviate the possibility of damage or injury to the clothes or other articles through being caught or jammed by the movable or collapsing sides of the revolving receptacle.

Figs. 5 to 7 illustrate a further modification, wherein I place a partition $a^3$ centrally in the box or case $a$, so as to form two chambers or compartments. In each of these chambers or compartments I provide a rectangular or other suitably-shaped receptacle $b$ for the articles intended to be washed or cleansed. The receptacles $b$ are substantially similar in construction to the rotating receptacle hereinbefore described.

F F are portions of clutches arranged to move laterally upon the shafts or gudgeons $c$ of the rotating receptacles $b$, but prevented from turning upon the said shafts or gudgeons by means of feathers $c'$. The bosses D' of the toothed wheels D are constructed so as to form the other halves or portions of the said clutches F, and the toothed wheels D are so arranged that when the said clutches are not in gear the said toothed wheels are free to rotate upon the shafts or gudgeons C. The portions F of the said clutches are provided with levers F', pivoted at $F^2$ to brackets $F^3$, secured to the frame of the machine. The said clutches F can be operated by means of the said levers F', so as to throw either of the toothed wheels D, and therefore receptacles $b$, out of gear, and thus arrest its motion.

G G are hand-wheels, keyed or otherwise secured upon the shafts or gudgeons $c$ for turning the said receptacles $b$ by hand, so as to bring their doors opposite the doors in the casing $a$. When the said receptacles are in the required position, they may be locked or secured by means of catches G', pivoted at $G^2$ to the brackets $F^3$.

In order to periodically reverse the motion of the receptacles $b$, I prefer to employ the device illustrated in Figs. 5 to 7. The shaft C, carrying the fast or driving pulley B and the loose pulley B', is supported at one extremity in a bearing C' in the standard E, and is arranged to pivot upon studs $C^2$. The other extremity of the said shaft C is supported in a suitable bearing in a block H, arranged to slide laterally in a bracket I, firmly attached to the frame of the machine.

J is a toothed wheel arranged to turn freely upon a stud J', also fixed to the frame of the machine. The toothed wheel J gears with the toothed wheels D. The said toothed wheel J is formed with a recess J², preferably provided with teeth or projections J³.

K is a friction-wheel, also provided with teeth or projections K' and firmly secured by means of a key or otherwise upon the shaft C.

K² is another friction-wheel similar to the friction-wheel K, and gearing therewith or adapted to be rotated thereby. The friction-wheel K² is carried upon a stud K³, secured to the block H. I prefer to pass the said stud K³ through an elongated or slotted hole H' in the said block H and to provide a setting-up screw H², by means of which the said stud K³, and therefore the friction-wheel K², can be moved toward the friction-wheel K, so as to cause them to bear more or less against each other.

L is a cam, which bears against rollers M, carried by brackets M', either attached to or forming part of the bracket I; or the said rollers may be supported in any other suitable manner. The cam L is arranged to turn freely upon the shaft C.

N is a toothed wheel firmly secured to or formed in one with the said cam L. The toothed wheel N gears with a pinion O, fixed upon a spindle O', carried by an extension H³ of the block H, or by a suitable bracket firmly attached thereto. Upon the other extremity of the spindle O' is provided a miter-wheel or bevel-wheel P, which gears with another miter-wheel or bevel-wheel P', either formed in one with or firmly secured to a worm-wheel Q. The miter-wheel or bevel-wheel P' and worm-wheel Q are carried upon a spindle R, also supported in the bracket or extension H³. S is a worm firmly attached to the shaft C and gearing with the worm-wheel Q. In this manner when the shaft C is rotated rotary motion is also imparted to the cam L through the worm S, worm-wheel Q, and gearing P', P, O, and N. The extremity of the said shaft C is slightly moved by the said cam L alternately to the right and to the left, so as to cause either the friction-wheel K² or the friction-wheel K to bear against the teeth or projections provided in the recess J² in the toothed wheel J, and therefore to cause the said wheel J to rotate either in one or the other direction, thus reversing the movement of the revolving receptacles b. This periodical reversion may be performed at longer or shorter intervals by altering the pitch of the worm S and worm-wheel Q.

The driving-shaft k' of the wringer k is in this instance extended and is supported in a suitable bearing in an extension I', bolted or otherwise secured to the bracket I and to the frame of the machine.

k² is a pulley keyed or otherwise secured upon the extremity of the shaft k'. Motion is preferably imparted to the wringer k by means of a belt from an extension B² upon the boss of the loose pulley B'. By means of this arrangement the wringer k is not operated until the rotating receptacles b are stopped by passing the driving-belt from the fast or driving pulley B onto the loose pulley B'. This arrangement is advantageous, as the wringer k is not required for use until the revolving receptacles b are stopped.

To reverse the motion of the wringer for convenience of passing the articles from one or other of the revolving receptacles b through it, I prefer to employ the lever T. U U' U² are toothed wheels carried upon suitable studs upon the said lever, so as to be free to rotate thereon. The toothed wheels U and U' gear with another toothed wheel V, keyed or otherwise secured upon the shaft k'. By raising or lowering the long arm of the lever T either the toothed wheel U or the toothed wheel U² can be caused to gear with a toothed wheel W, keyed or otherwise secured to the spindle of one of the rollers of the wringer k, thereby communicating motion thereto from the shaft k' either through the toothed wheels V, U, and W or through the toothed wheels V, U', U², and W, and rotating the said wringer in one or the other direction. X is a quadrant for securing the lever T in either position.

By forming my washing-machine duplex or double I am enabled to wash or cleanse the articles contained in one chamber or compartment, and then pass them into the second chamber or compartment with or without passing them through the wringer k. The clothes or other articles are thus subjected to two washings without the necessity of removing them from one machine to another at a greater or less distance therefrom, thereby saving labor and obviating or diminishing the risk of the said clothes or other articles being soiled or damaged during the said removal and transit, and moreover reducing the amount of apparatus required to perform a given quantity of work.

Figs. 8 and 9 illustrate a modification of the apparatus provided with the perforated partitions or diaphragms, wherein I form one of the sides of the revolving receptacle or receptacles b removable, and I provide upon it a basket or cage formed of perforated plate metal or other suitable material, intended to contain the articles to be washed. m are hinged bolts provided with wing-nuts m' for securing the removable side and basket or cage in position. In this case the said articles can be removed bodily from the revolving receptacle in the said basket or cage by unfastening the side to which the said basket or cage is attached.

The hereinbefore-described device for periodically reversing the movement of the receptacles b may also be advantageously applied to a machine with a single revolving receptacle. In this case the toothed wheel or friction-wheel J is keyed or otherwise secured to the extremity of the spindle or gudgeon of the said receptacle, and the external teeth upon the said toothed wheel or friction-wheel are dispensed with, as also the intermediate gearings.

What I claim is—

1. The combination, with a suitable case, of a perforated washing-chamber having pivoted movable sides, substantially as described.

2. The combination, with a suitable case provided with a cam-groove, of the washing-chamber having pivoted movable sides and arms connected to said movable sides and adapted to work in said cam-groove, substantially as described.

3. The combination, with a suitable casing, of a perforated washing-chamber located therein and a pivoted cam-operated collapsing side adapted to alternately force water through and withdraw it from the washing-chamber, substantially as described.

4. In a washing-machine, the combination, with a revolving washing-chamber having perforated diaphragms, of movable or collapsing sides pivoted to said washing-chamber, substantially as described.

5. The combination, with the rotating washing-chamber, of the recessed tooth-wheel, friction-wheels adapted to engage with the recessed portion of said wheel, and means, substantially as described, for engaging and disengaging said friction-wheels from said recessed wheels, whereby the rotation of the washing-chamber is reversed, substantially as described.

6. The combination, with a perforated rotating washing-chamber having movable sides, of a removable side having a basket or cage secured thereto, substantially as and for the purposes described.

7. The combination, with a suitable receptacle and a rotating washing-chamber located therein, of the movable sides to said washing-chamber, arms on said sides, and a cam-groove in which said arms work, whereby said sides are moved inwardly twice during each revolution of the washing-chamber, substantially as described.

8. In a washing-machine, a rotary washing-chamber provided with two opposite movable sides, one of which is pivoted at its upper and the other at its lower end to the washing-chamber, and a cam-groove adapted through the medium of friction-rollers on the movable sides to press said sides inwardly, substantially as described.

In testimony whereof I have hereunto signed my name in the presence of two subscribing witnesses.

WILLIAM SHEDLOCK.

Witnesses:
A. H. SLEATH,
CHAS. E. GREENFIELD.